United States Patent
Rosenberg

[11] Patent Number: 6,095,185
[45] Date of Patent: Aug. 1, 2000

[54] FLUID-FLOW CONTROL DEVICE PARTICULARLY USEFUL AS A DRIP-IRRIGATION EMITTER

[76] Inventor: Peretz Rosenberg, Moshau Beit Shearim, 30046 D.N. Haamakin, Israel

[21] Appl. No.: 09/361,561

[22] Filed: Jul. 27, 1999

[51] Int. Cl.[7] .................................................. F16K 15/00
[52] U.S. Cl. .................................. 137/512.15; 137/512.1; 137/533; 239/542
[58] Field of Search ........................... 137/512.1, 512.15, 137/512.4, 512.5, 533; 251/145; 239/542, 547, 570, 272, 271

[56] References Cited

U.S. PATENT DOCUMENTS

| | | | |
|---|---|---|---|
| 3,777,980 | 12/1973 | Allport | 239/542 |
| 3,807,430 | 4/1974 | Keller | 239/542 |
| 3,938,552 | 2/1976 | Rosenberg . | |
| 3,965,934 | 6/1976 | Rosenberg . | |
| 4,014,473 | 3/1977 | Rosenberg | 239/542 |
| 4,059,228 | 11/1977 | Werner | 239/542 |
| 4,084,749 | 4/1978 | Drori | 239/542 |
| 4,105,162 | 8/1978 | Drori | 239/542 |
| 4,159,805 | 7/1979 | Von Lutzow | 239/542 |
| 4,223,838 | 9/1980 | Maria-Vittorio-Torrisi | 239/542 |
| 4,288,035 | 9/1981 | Rosenberg . | |
| 4,344,576 | 8/1982 | Smith | 239/542 |
| 4,382,549 | 5/1983 | Christy et al. . | |
| 4,660,769 | 4/1987 | Rosenberg | 239/542 |
| 5,163,779 | 11/1992 | King, Sr. | 137/512.4 |

*Primary Examiner*—Gregory L. Huson
*Assistant Examiner*—Joanne Y. Kim
*Attorney, Agent, or Firm*—Benjamin J. Barish

[57] ABSTRACT

A fluid-flow control device particularly useful as a drip-irrigation emitter, includes a housing having first and second housing sections attachable to each other to define an internal chamber. The first housing section includes an inlet opening at one side of the chamber, and the second housing section includes a hollow stem projecting into the chamber from the opposite side of the chamber and defining an outlet opening from the chamber. A control ring is located within the chamber around the hollow stem and is freely movable, as guided by the hollow stem, towards and away from the inlet opening to control the flow therethrough into the chamber, and thereby the flow through the outlet opening from the chamber.

20 Claims, 2 Drawing Sheets

FLUID-FLOW CONTROL DEVICE PARTICULARLY USEFUL AS A DRIP-IRRIGATION EMITTER

FIELD AND BACKGROUND OF THE INVENTION

The present invention relates to fluid-flow control devices, particularly to such devices as are now widely used as drip-irrigation emitters. The invention also relates to a drip-irrigation line including a plurality of such emitters.

Many types of drip-irrigation emitters are known and widely used for supplying water directly to the root zone of the plants at a slow controlled rate. The invention of the present application is particularly related to the type of drip irrigation emitter described in U.S. Pat. Nos. 3,938,552, 4,288,035, and 4,660,769, and provides a number of important advantages as will be described more particularly below.

BRIEF SUMMARY OF THE INVENTION

According to one aspect of the present invention, there is provided a fluid-flow control device particularly useful as a drip-irrigation emitter, comprising: a housing including first and second housing sections attachable to each other to define an internal chamber; the first housing section including an inlet opening at one side of the chamber, and the second housing section including a hollow stem projecting into the chamber from the opposite side of the chamber and defining an outlet opening from the chamber; and a control ring located within the chamber around the hollow stem and freely movable, as guided by the hollow stem, towards and away from the inlet opening to control the flow therethrough into the chamber, and thereby the flow through the outlet opening from the chamber.

According to further features in the preferred embodiment of the invention described below, the second housing section is formed with spacing projections around the hollow stem engagable with the control ring for spacing the control ring from the surface of the second housing section formed with the hollow stem. Also, the control ring is formed with a flat surface on one side facing the inlet opening, and with a flat surface on the opposite side facing the spacing projections.

More particularly, the hollow stem and the chamber have a common axis, and the first housing section is formed with at least two inlet openings on opposite sides of the common axis. The chamber, hollow stem, and control ring are all of circular cross-section. In addition, the cross-sectional area of the control ring facing the projection is larger by at least one order of magnitude, preferably one to two orders of magnitude, than the total cross-sectional areas of the inlet openings.

As will be described more particularly below, a drip irrigation emitter constructed in accordance with the foregoing features provide a number of important advantages.

One very important feature is that the drip irrigation emitter may be used with very low pressures, e.g., in gravity-fed water supply systems, and therefore the novel devices are especially useful in locations where pressurized water is not available or is very expensive. In addition, the foregoing features enable drip irrigation emitters to be constructed with but three simple parts, which parts require a relatively low level of precision, thereby enabling the emitter to be produced in volume and at low cost. A further important advantage is that an emitter constructed in accordance with the foregoing features can be provided with relatively large openings exhibiting less sensitivity to clogging, as compared to other previously-known emitters.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
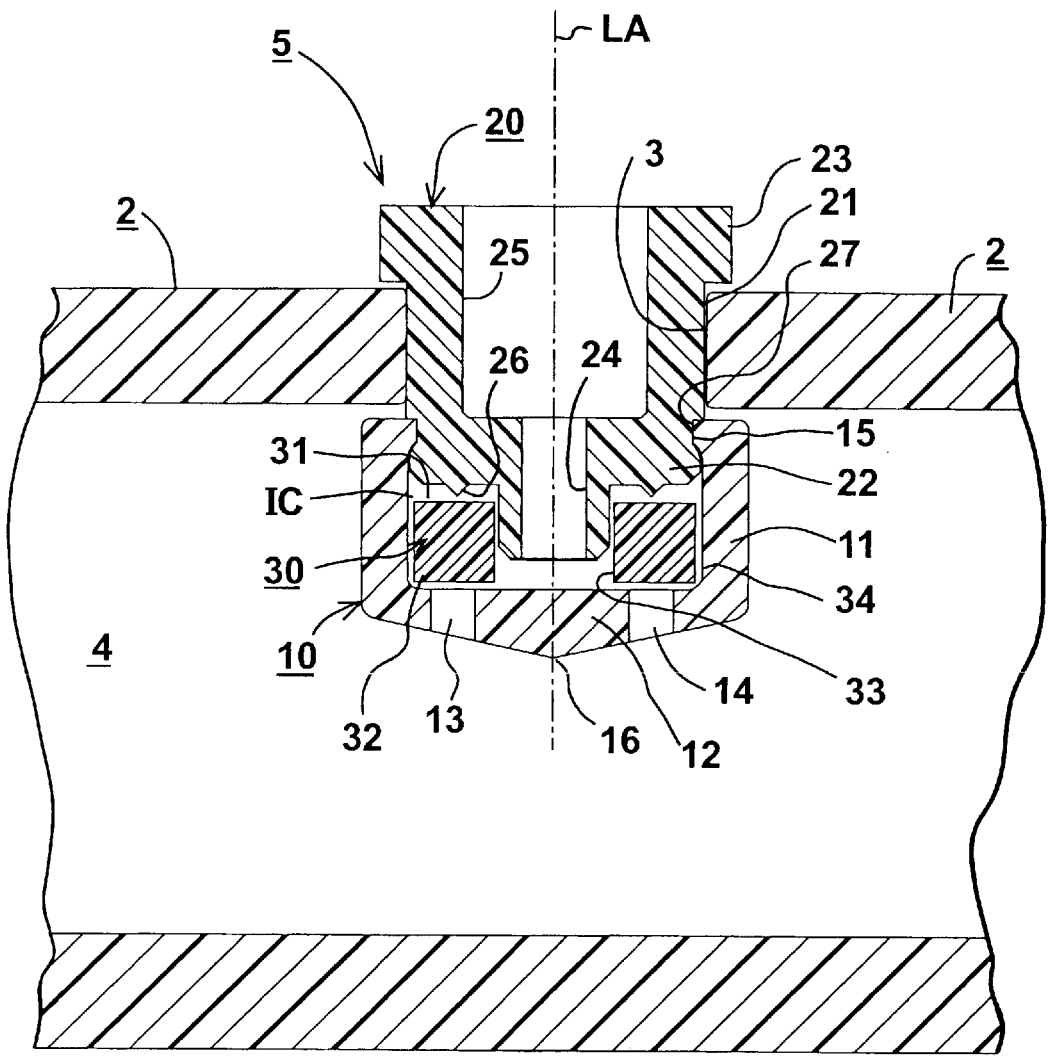
FIG. 1 is a sectional view of a part of a drip irrigation line illustrating one form of drip irrigation emitter constructed in accordance with the present invention.

With reference first to FIG. 1, there is illustrated a part of a drip irrigation line including a water supply pipe 2 formed with a plurality of openings 3 spaced along its length (only one of which is shown in FIG. 1) for discharging water from the interior 4 of the pipe externally of the pipe. For this purpose, each of the openings 3 in the water supply pipe 2 receives a drip irrigation emitter, generally designated 5, for producing a slow flow of water from the interior 4 of the pipe, to the plants externally of the pipe.

The drip-irrigation emitter 5 includes but three parts: a first housing section 10; a second housing section 20 attachable to housing section 10 to define an internal chamber IC; and a control ring 30 located within the internal chamber IC for controling the flow of the water from the interior 4 of the pipe externally of the pipe.

Housing section 10 includes a cylindrical side wall 11 open at one end and closed at the opposite end by an end wall 12. End wall 12 is formed with a pair of openings 13, 14 on opposite sides of the longitudinal axis LA of the emitter 5, which openings serve as inlets into the emitter. The open end of housing section 10 is formed with an inner annular rib 15 for attaching housing section 10 to housing section 20. End wall 12 of housing section 10 is of a conical configuration, having its apex 16 on the longitudinal axis LA of the assembled drip irrigation emitter 5, to facilitate inserting the assembled drip irrigation emitter through opening 3 in the water supply pipe 2.

Housing section 20 also includes a cylindrical side wall 21. Side wall 21 has an outer diameter substantially equal to the diameter of the opening 3 in the water supply pipe 2 so that it is firmly gripped by the sides of the opening 3 in the water supply pipe when the drip irrigation emitter 5 is mounted therein as shown in FIG. 1. One end of housing section 20 includes an end wall 22, and the opposite end is open but is enlarged in diameter, as shown at 23, to provide an enlarged head for retaining the drip irrigation emitter 5 within the opening 3 in the water supply pipe 2 when mounted therein.

End wall 22 of housing section 20 is formed with a hollow stem 24 coaxial with the longitudinal axis LA. Hollow stem 24 projects into the internal chamber IC and serves as an outlet from that chamber, but terminates short of end wall 12 of housing section 10. Cylindrical side wall 21 and the enlarged head 23 of housing section 20 define a cylindrical cavity 25 serving as a reservoir for accumulating the water outletted via the hollow stem 24.

End wall 22 is further formed with a plurality of spacing projections 26 extending into the internal chamber IC defined by the two housing sections 20 and 10. Projections 26 space the control ring 30 from the surface of end wall 22 surounding the hollow stem 24, as will be described more particularly below. The outer surface of side wall 21 is formed with an annular recess 27 for receiving rib 15 of housing section 10.

Figure 2:
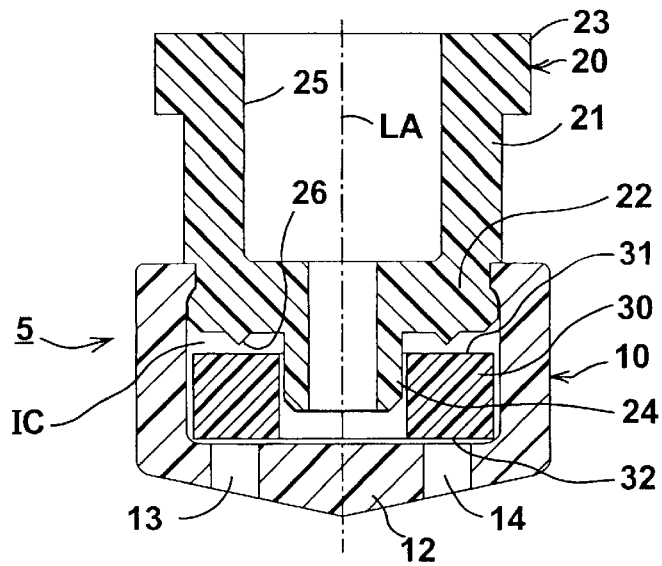
FIG. 2 illustrates the drip irrigation emitter of FIG. 1 in the condition wherein its inlets are closed.
Figure 3:
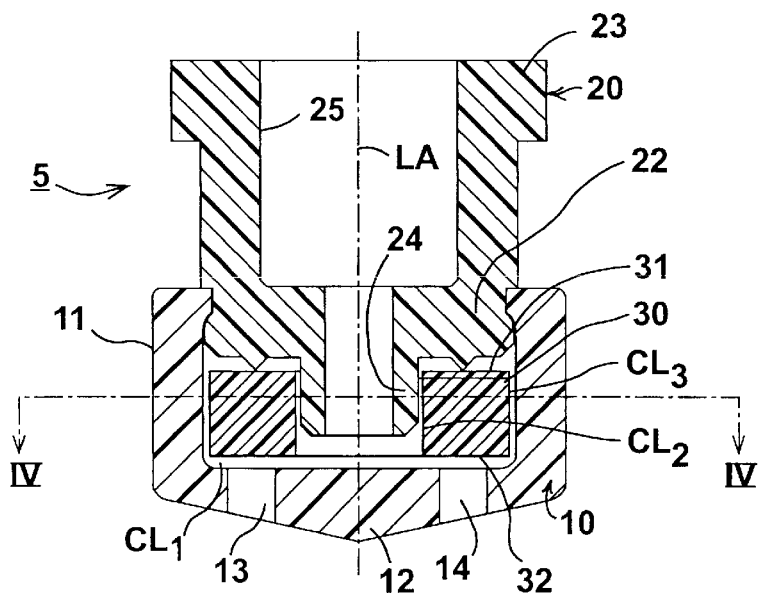
FIG. 3 illustrates the drip irrigation emitter of FIG. 1 in the condition wherein its inlets are open.

Control ring 30 is located within the internal chamber IC and is freely movable within that chamber from the two extreme positions illustarted in FIGS. 2 and 3, respectively. In one position of the control ring 30, as illustrated in FIG. 2, it closes the two inlets 13, 14; but in the other portion as illustrated in FIG. 3, it opens the two inlet openings 13, 14, to permit the water to pass via them and the internal chamber IC to the outlet defined by the hollow stem 24. During the normal operation of the illustarted emitter, control ring 30 oscillates or vibrates between the two positions illustrated in FIGS. 2 and 3.

Control ring 30 is of circular cross-section and is formed with flat upper and lower faces 31, 32, respectively. It is of a thickness slightly less than the distance between the inner surface of end wall 12 and the tip of the spacing projections 26 to enable the ring to move axially towards and away from the two inlet openings 13, 14, as guided by the hollow stem 24. It produces a clearance $CL_1$ when spaced away from the inlet openings 13, 14, as shown in FIG. 3.

Figure 4:
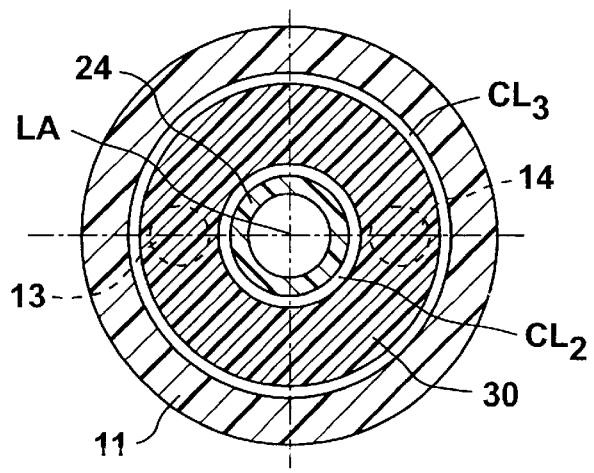
FIG. 4 is a sectional view along line IV–IV if FIG. 3.

The inner diameter 33 of control ring 30 is slightly larger than the outer diameter of the hollow stem 24, so as to produce a clearance, shown as $CL_2$ in FIG. 4; and the outer diameter 34 of the control ring 30 is slightly smaller than the inner diameter of the cylindrical side wall 11 of housing section 10 to produce a clearance $CL_3$.

The foregoing clearances $CL_1$, $CL_2$ and $CL_3$ determine the flow rate of the water through the emitter, and can be designed according to the particular requirements for the respective emitter. Generally speaking, clearance $CL_1$ would be from 0.2 to 1.0 mm; and clearances $CL_2$ and $CL_3$ would generally be from 0.05 to 0.5 mm each. In the example to be described below, clearance $CL_1$ is approximately 0.5 mm; and clearances $CL_2$, $CL_3$ are each approximately 0.1 mm.

The cross-sectional area of the control ring 30, particularly its upper surface 31, should be at least one order of magnitude, preferably from one to two orders of magnitude, larger than the total cross-sectional areas of the two inlet openings 13, 14. In the preferred embodiment described below, the cross-sectional area of surface 31 of the control ring 30 is approximately 40 times larger than the sum of the cross-sectional areas of the two inlet openings 13, 14.

The drip-irrigation emitter, when assembled as shown in FIG. 1 and inserted into the water supply pipe 2, operates as follows.

The pressurized water in the interior 4 of the water supply pipe 2 causes the control ring 30 within the internal chamber IC to oscillate towards and away from the two inlet openings 13, 14, to control the flow of the water through the inlet openings 13, 14, and thereby, through the outlet defined by the hollow stem 24. Thus, at the start the control ring 30 is in the position illustrated in FIG. 2 wherein it closes the two inlet openings 13, 14. The pressurized water applied via the inlet openings will lift the control ring until it limits against the spacing projections 26, as shown in FIG. 3. This will permit water applied via the inlets 13, 14, to flow directly to the outlet defined by the hollow stem 24. It will also permit water to flow via clearance $CL_3$, between the outer surface 34 of the control ring and the inner surface of side wall 11, to the space between surface 31 of the control ring and end wall 22 of housing section 20. This causes a build-up of pressure within that space. Since the cross-sectional area of surface 31 of control ring 30 is from one to two orders of magnitude larger than the cross-sectional area of the two inlet openings 13, 14, the pressure built-up within the space will force the control ring 30 back towards the inlet openings 13, 14, closing the inlet openings. When the inlet openings 13, 14 are thus closed, the pressure build-up within the space between surface 31 and end wall 22 will be dissipated via clearabce $CL_2$ until the pressure at the inlets 13, 14 is again sufficient to move the control ring away from the two inlets, thereby repeating the oscillatory cycle.

As one example, the control ring 30 may have an outer diameter of 5 mm, and an inner diameter of 2 mm; the diameters of the two inlet openings 13, 14, may each be 0.9 mm; clearance $CL_1$ may be 0.5 mm; clearance $CL_2$ may be 0.1 mm; clearance $CL_3$ may be 0.1 mm; and the inner diameter of the hollow stem 24, serving as the outlet, may be 1.5 mm.

While the invention has been described with respect to one preferred embodiment, it will be appreciated that this is set forth merely for purposes of example, and that many other variations, modifications and applications of the invention may be made.

What is claimed is:

1. A fluid-flow control device particularly useful as a drip-irrigation emitter, comprising:

a housing including first and second housing sections attachable to each other to define an internal chamber;

said first housing section including an inlet opening at one side of said chamber, and said second housing section including a hollow stem projecting into said chamber from the opposite side of said chamber and defining an outlet opening from said chamber;

and a control ring located within said chamber around said hollow stem and freely movable, as guided by said hollow stem, towards and away from said inlet opening to control the flow therethrough into said chamber, and thereby the flow through the outlet opening from said chamber.

2. The device according to claim 1, wherein said second housing section is formed with spacing projections around said hollow stem engagable with the control ring for spacing the control ring from the surface of said second housing section formed with said hollow stem.

3. The device according to claim 2, wherein said control ring is formed with a flat surface on one side facing said inlet opeining, and with a flat surface on the opposite side facing said spacing projections.

4. The device according to claim 3, wherein said hollow stem and said chamber have a common axis, and said first housing section is formed with at least two inlet openings on opposite sides of said common axis.

5. The device according to claim 4, wherein said chamber, hollow stem, and control ring are all of circular cross-section.

6. The device according to claim 5, wherein the cross-sectional area of said control ring facing said projections is larger by at least one order of magnitude than the total cross-sectional areas of said inlet openings.

7. The device according to claim 5, wherein the cross-sectional area of said control ring is larger by one to two orders of magnitude than the total cross-sectional areas of said inlet openings.

8. The device according to claim 5, wherein said first housing section, hollow stem, and control ring are dimensioned to produce a clearance of 0.05 to 0.5 mm between the inner surface of said control ring and said hollow stem, and a similar clearance between the outer surface of said control ring and said first housing section.

9. The device according to claim 8, wherein said clearances are each about 0.1 mm.

10. The device according to claim 8, wherein said spacing projections are of a height to produce a clearance between the control ring and said inlet openings of 0.2 to 1.0 mm.

11. The device according to claim 10, wherein said spacing projections are of a height to produce a clearance of about 0.5 mm between the control ring and said inlet openings.

12. The device according to claim 1, wherein said second housing section is formed with a cavity defining a reservoir for receiving the water from said outlet opening.

13. The device according to claim 1, wherein said housing includes an outer annular recess for mounting the device in an opening of a water supply pipe, with said first housing section located within the water supply pipe.

14. A fluid-flow control device particularly useful as a drip-irrigation emitter, comprising:

a housing including first and second housing sections attachable to each other to define an internal chamber;

said first housing section including at least one inlet opening at one side of said chamber, and said second housing section including a hollow stem projecting into said chamber from the opposite side of said chamber but terminating short of said first housing section to define an outlet opening from said chamber;

and a control ring located within said chamber around said hollow stem a nd freely movable, as guided by said hollow stem, towards and away from said inlet opening to control the flow therethrough into said chamber, and thereby the flow through the outlet opening from said chamber.

15. The device according to claim 14, wherein said second housing section is formed with spacing projections around said hollow stem engagable with the control ring for spacing the control ring from the surface of said second housing section formed with said hollow stem.

16. The device according to claim 15, wherein said control ring is formed with a flat surface on one side facing said inlet opeining, and with a flat surface on the opposite side facing said spacing projections.

17. The device according to claim 16, wherein said hollow stem and said chamber have common axis, and said first housing section is formed with at least two inlet openings on opposite sides of said common axis.

18. The device according to claim 17, wherein said chamber, hollow stem, and control ring are all of circular cross-section.

19. The device according to claim 18, wherein the cross-sectional area of said control ring facing said projections is larger by at least one order of magnitude than the total cross-sectional areas of said inlet openings.

20. A drip irrigation emitter line including a water supply pipe formed with a plurality of openings spaced along its length, and with a fluid-flow control device according to claim 14 in each of said openings.

* * * * *